US005668377A

United States Patent [19]

Erickson

[11] Patent Number: 5,668,377

[45] Date of Patent: Sep. 16, 1997

[54] POINT OF SALE COUNTERFEIT DETECTION APPARATUS

[76] Inventor: Win Erickson, 5790 Marigold La., Duluth, Minn. 55810

[21] Appl. No.: 622,739

[22] Filed: Mar. 27, 1996

[51] Int. Cl.[6] ..................... G01N 21/64

[52] U.S. Cl. ..................... 250/504 R; 250/461.1

[58] Field of Search ..................... 250/504 R, 493.1, 250/494.1, 461.1, 372; 283/89; 356/71

[56] References Cited

U.S. PATENT DOCUMENTS

| | | | |
|---|---|---|---|
| 1,195,912 | 8/1916 | Cummings et al. | 88/14 |
| 2,059,197 | 11/1936 | Backer et al. . | |
| 2,161,594 | 6/1939 | Ruth | 88/14 |
| 3,480,785 | 11/1969 | Aufderheide | 356/71 |
| 3,767,305 | 10/1973 | Craven | 356/71 |
| 3,774,046 | 11/1973 | Hoch et al. | 250/485 |
| 3,842,281 | 10/1974 | Goodrich | 250/461 |
| 4,146,792 | 3/1979 | Stenzel et al. | 250/365 |
| 4,153,335 | 5/1979 | Buchan | 350/150 |
| 4,296,326 | 10/1981 | Haslop et al. | 250/372 |
| 4,406,539 | 9/1983 | Chamoux | 355/43 |
| 4,558,224 | 12/1985 | Gober | 250/461.1 |
| 5,280,333 | 1/1994 | Wunderer | 356/71 |

*Primary Examiner*—Jack I. Berman
*Assistant Examiner*—Kiet T. Nguyen
*Attorney, Agent, or Firm*—Frank J. McGue

[57] ABSTRACT

A counterfeit detection apparatus for analyzing paper to detect counterfeits thereof is disclosed. The apparatus comprises a structure and a foot mounted below the structure. A first lens is mounted atop the structure while the paper is mounted in the bottom of the structure above the foot. A ultraviolet light and at least one top light are mounted on the structure between the first lens and the paper while a back light is mounted in the foot below the paper. The apparatus includes a control circuit in electrical communication with the ultraviolet light, the at least one top light and the back light which sequentially activates the ultraviolet light, the at least one top light and the back light.

16 Claims, 3 Drawing Sheets

FIG. 3
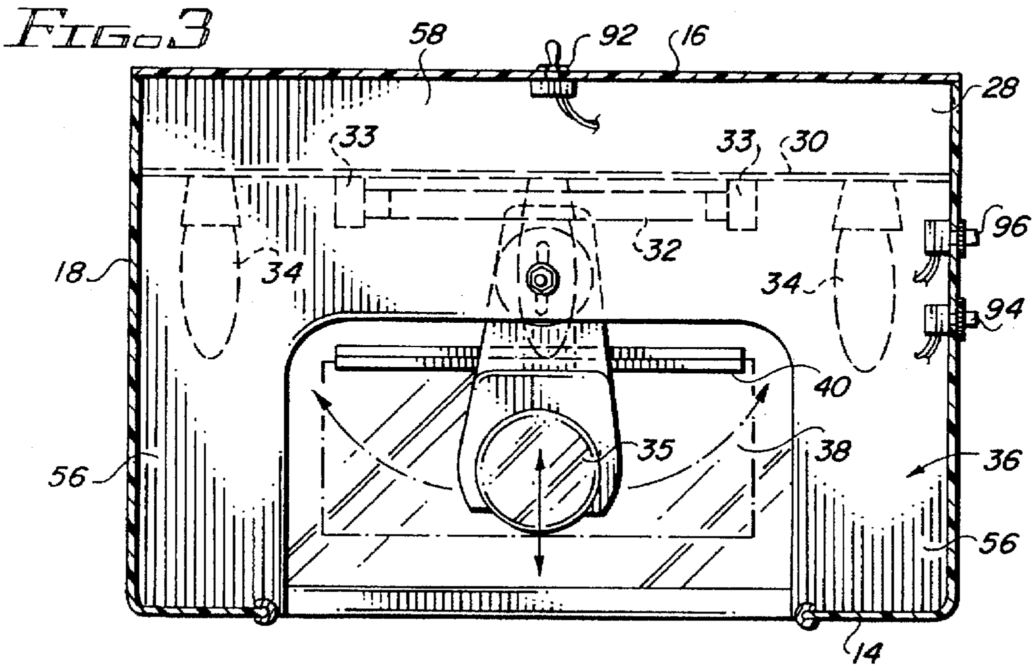
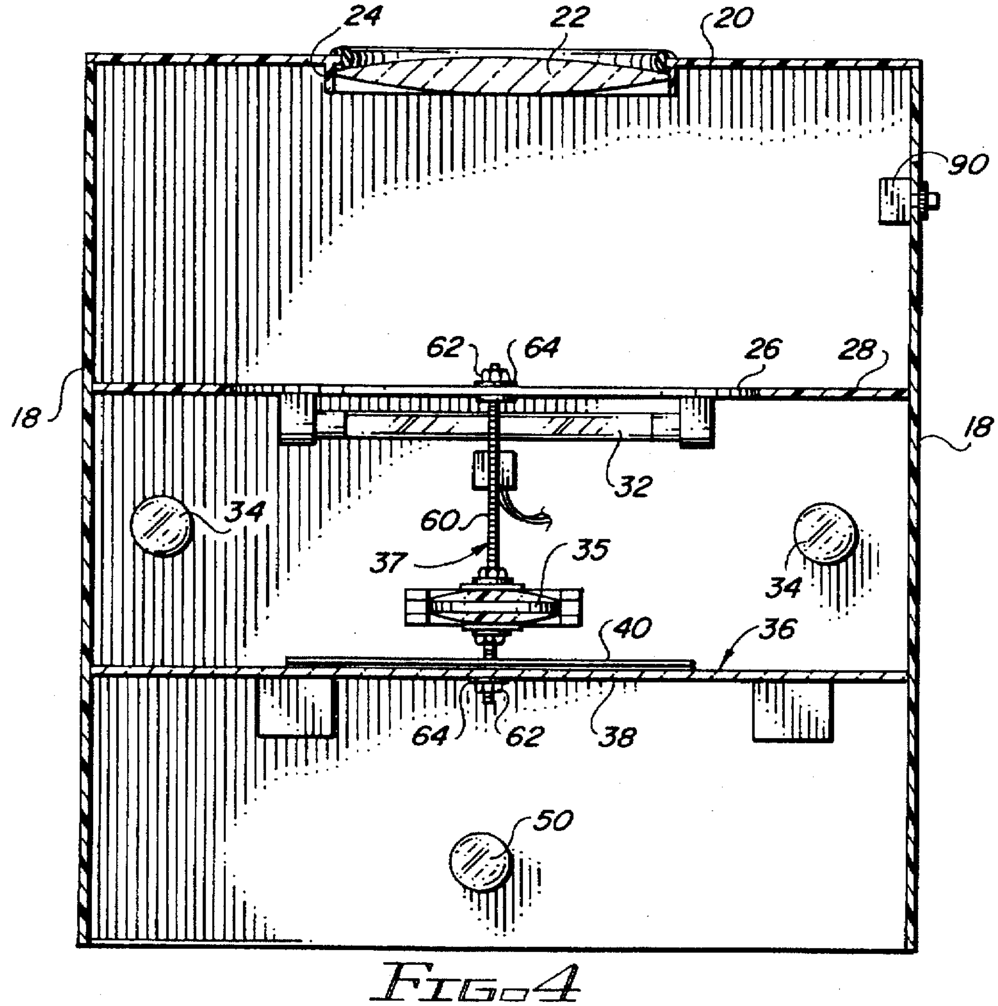
FIG. 4

POINT OF SALE COUNTERFEIT DETECTION APPARATUS

TECHNICAL FIELD

This invention relates to a counterfeit detection apparatus, and, more particularly, to a apparatus which is used at a point of sale to identify counterfeit paper such as currency, checks, money orders, credit cards and the like by detection of security features incorporated in such paper.

BACKGROUND OF THE INVENTION

The use of counterfeit paper by the criminal element to obtain goods and/or services from merchants is a serious problem. If such bogus paper is accepted by the merchant as payment for goods or services, it is usually impossible to later recover the loss from the criminal. The loss occurs once the bogus paper is accepted by the cashier who is unable to visually determine the genuineness of the paper presented for payment.

As used herein, the term "paper" refers to items such as currency, checks, money orders, credit cards and the like.

To assist merchants and others to combat this problem, security features are often incorporated into paper. However, detection of such security features usually requires special lighting or magnification. Such special lighting or magnification is not generally available to the front line cashiers. In addition, different paper may have distinctly different security features. For example, the currency of the United States incorporates microprinting as a security feature which requires magnification to read while special water marks may be incorporated into checks which requires back lighting to illuminate.

To detect counterfeit paper, experts will employ a number of different methods. Ultraviolet or black lights are used to detect fluorescence or lack thereof, the use of bleached paper or erasures or deletions. Back lighting is useful to detect cuts or erasures and to illuminate translucent features and water marks. Top lighting is used for illumination for magnification. A low power (about 2×) magnification is useful to survey the entire paper while a higher magnification (about 8×) is useful to review microprinting.

However, cashiers and the like cannot be expected to run complex equipment or spend an inordinate amount of time inspecting every paper presented in payment for goods and services. Nor can the merchant expect to add expensive or bulky counterfeit detection equipment for each and every checkout station in a given store. Thus, there is a need for a small, inexpensive, easy to operate point of sale counterfeit detection apparatus for merchants.

There have been some earlier attempts to solve these problems. U.S. Pat. No. 2,059,197 which issued to Backer et al. discloses a counterfeit money detector having two lamps and two levels of magnification provided by two different lenses. Backer et al. do not disclose the use of a black light or sequencing circuitry.

U.S. Pat. No. 2,161,594 which issued to Ruth provides a counterfeit money detector made small so it can be mounted on a cash register so as to be unnoticed by a customer.

U.S. Pat. No. 3,774,046 which issued to Hoch et al. discloses a counterfeit currency detector having an ultraviolet light mounted within a box-like structure.

U.S. Pat. No. 3,480,785 which issued to Aufderheide provides a document validating apparatus having a plurality of light sources, each light source emitting light in a discretely different band color spectra. In one example, one light is ultraviolet, one green and one pink. The lamps are sequentially energized. Aufderheide does not show back lighting or magnification.

U.S. Pat. No. 4,296,326 which issued to Haslop et al. discloses a method of detecting sheets which do not have a genuine watermark by measurement of ultraviolet radiation.

U.S. Pat. No. 5,280,333 which issued to Wunderer discloses an apparatus and method for testing documents. One light guide is provided with fluorescent substance for directing at least two light fractions of different wavelengths onto a common area of a document. The light fractions are switched on and off by a time division multiplex method.

U.S. Pat. No. 4,153,335 which issued to Buchan discloses a means for increasing the visibility of low contrast images by periodically varying the brightness of lights illuminating the subject.

U. S. Pat. No. 4,146,792 which issued to Stenzel et al. provides an authenticity checking device utilizing lenses which direct light reflections onto photocells.

None of the known prior art disclose the combination which comprises the apparatus set forth herein.

SUMMARY OF THE INVENTION

It is an object of this invention to provide a small, inexpensive, easy to operate point of sale counterfeit detection apparatus.

It is a further object of this invention to provide a point of sale apparatus employing a variety of lighting and magnification devices to detect the presence or absence of security features incorporated into paper to facilitate the detection of counterfeit paper.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawings in which:

FIG. 3 is a cross sectional top view of the embodiment of FIG. 2 taken along line 3—3;

FIG. 4 is a front view of the embodiment of FIG. 1 with the front panel removed;

DESCRIPTION OF THE PREFERRED EMBODIMENT

Figure 1:
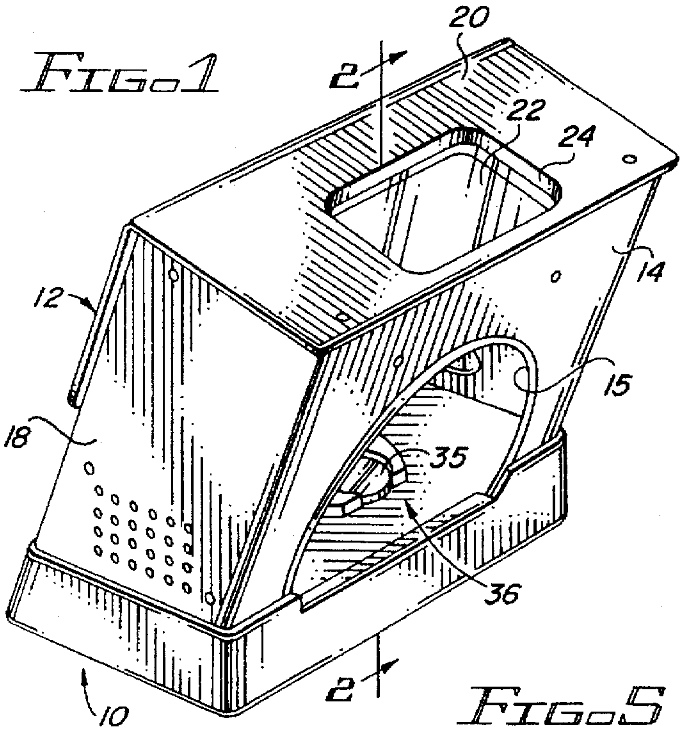
FIG. 1 is a perspective view of one embodiment of the present invention.

Referring more particularly to the drawings by characters of reference, FIGS. 1–6 disclose a point of sale counterfeit detection apparatus 10 comprising a structure 12 having a front panel 14 having a semicircular cutout 15, a rear panel 16, and two side panels 18; a lensing platform 20 having a first lens 22 and a lens support frame 24; a lighting platform 26 having a support frame 28; a light base 30 having an ultraviolet light 32 and two top lights 34 mounted thereto; a second lens 35 mounted on a lens mount 37 which extends between lighting platform 26 and a viewing platform 36, viewing platform 36 having a stationary viewer 38 and a mounting frame 40; and a foot portion 48 having a back light 50 contained therein.

Turning now to FIG. 1, in the illustrated embodiment, structure 12 presents a generally box shape which extend from lensing platform 20 to viewing platform 36. Lensing platform 20 and viewing platform 36 are mounted parallel to each other with lensing platform 20 being mounted at the top of structure 12 and viewing platform 36 being mounted about two (2) inches (5 centimeters) from the bottom 13 of structure 12.

In the preferred embodiment, structure 12 is thirteen (13) inches (33 centimeters) wide, eleven (11) inches (30 centimeters) tall and eight (8) inches (20 centimeters) deep. Lighting platform 26 is positioned between lensing platform 20 and viewing platform 36, preferably about five (5) inches (13 centimeters) below lensing platform 20.

Figure 2:
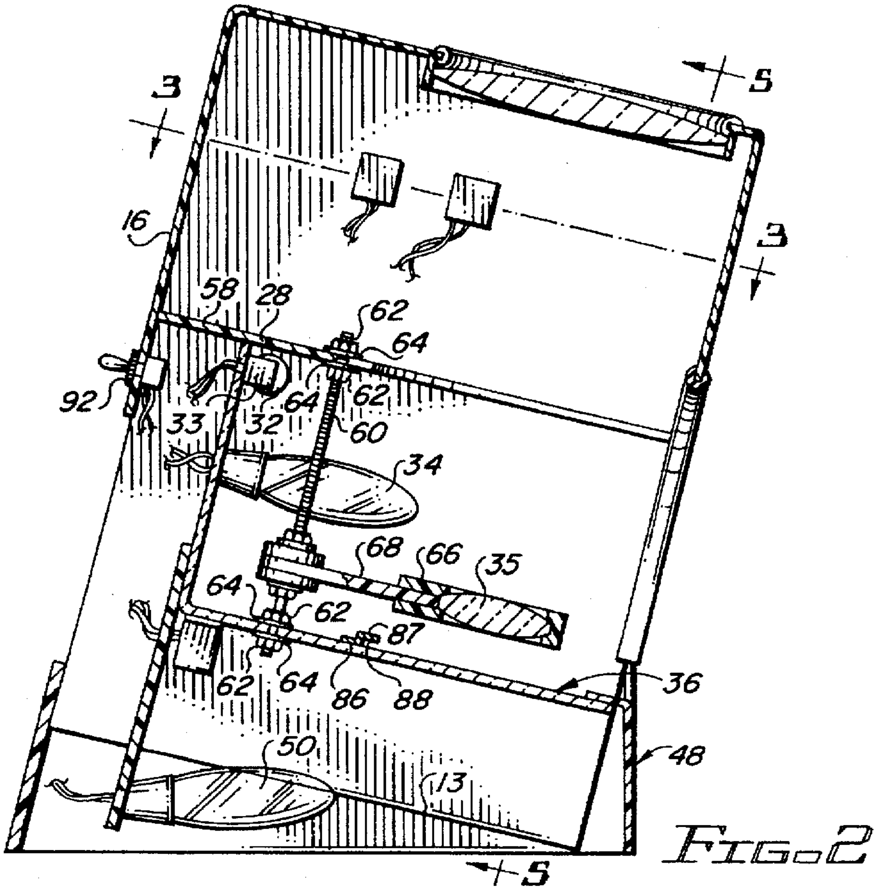
FIG. 2 is cross sectional side view of the embodiment of FIG. 1 taken along line 2—2.

The spacing between lensing platform 20 and viewing platform 36 is generally determined by the optical characteristics of first lens 22. The paper to be viewed is mounted in viewing platform 36 as described below and viewed by a user looking downwardly through first lens 22. As shown in FIGS. 1, 2 and 4, first lens 22 is mounted in lens support frame 24 which in turn is mounted onto lensing platform 20 atop structure 12. Thus, the focal length of first lens 22 essentially determines the physical separation between lensing platform 20 and viewing platform 36.

In the preferred embodiment, first lens 22 is a 2× biaspheric lens which is 124 millimeters×100 millimeters in dimension. The use of biaspheric first lens 22 in combination with the tilted foot portion 48 discussed below allows the user to view the paper mounted on viewing platform 20 without needing to change position, thus saving the store owner time and, perhaps, medical expenses for back problems of employees.

Turning now to FIGS. 2–4, lighting platform 26 appears as viewed in FIG. 3 as a horizontally oriented U-shape whose legs 56 extend forwardly from a base 58. Positioned underneath base 58 is ultraviolet or ultraviolet light 32, preferably a fluorescent tube mounted in fixtures 33 which are in turn mounted to light base 30. Light base 30 extends upwardly between base 58 and viewing platform 36 as best seen in FIG. 2. In the illustrated embodiment, light base 30 is integrally formed with viewing platform 36 of a suitable transparent plastic.

Mounted underneath each leg 56 are two top lights 34 which are preferably small conventional incandescent bulbs, preferably about 40 Watt bulbs. Top lights 34 and ultraviolet light 32 are mounted underneath the lighting platform 26 to prevent glare reaching the user's eyes, and, particularly in the case of ultraviolet light 32, for reasons of safety.

Figure 5:
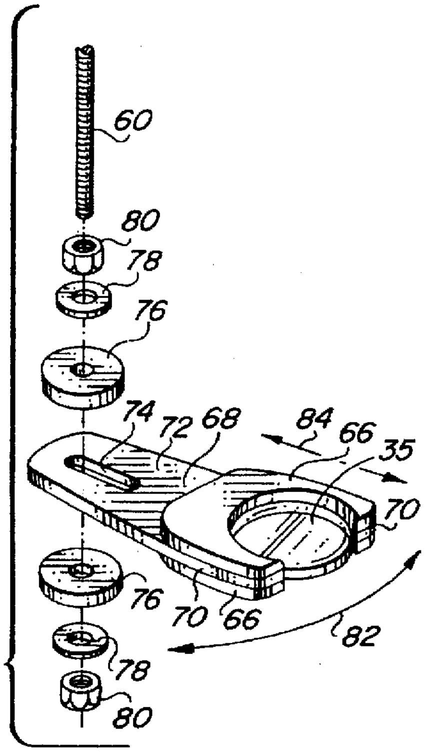
FIG. 5 is an exploded view of the mounting for an 8× magnifying lens used in the present invention.

As best seen in FIGS. 2, 4 and 5, extending between lighting platform 26 and viewing platform 36 is a lens mount 37 with a second lens 35 mounted thereon. Second lens 35 when viewed through first lens 22 preferably results in a magnification of about 8×. Viewing of the paper through second lens 35 is for closer inspection if warranted.

As best illustrated in FIG. 2, lens mount 37 comprises a threaded bolt 60 which extends through both lighting platform 26 and viewing platform 36. Bolt 60 is firmly secured to both platforms 26 and 36 by opposing nuts 62 in combination with washers 64.

As best illustrated in FIG. 5, lens mount 37 further comprises a Y-shaped lens handle 68 having two arms 70 with second lens 35 mounted therebetween thereby laterally securing lens 35 from movement relative thereto and two opposing lens holders 66 having second lens 35 and arms 70 mounted therebetween thereby securing lens 35 from vertical movement relative thereto.

Lens handle 68 further comprises a leg portion 72 extending rearwardly therefrom. Bolt 60 extends through a slot 74 in leg portion 72. To rotatably and slidably secure lens handle 68 to bolt 60, preferably about one and one quarter (1.25) inches (3 centimeters) above viewing platform 36, a combination of two opposing spacers 76, two opposing washers 78 and two opposing nuts 80 with bolt 60 extending therethrough are used on the top and bottom of lens handle 68. The above combination in conjunction with slot 74 allows lens handle 68, and hence lens 35, to rotate as shown by arrow 82 in FIG. 5 and slide in and out as shown by arrow 84 to provide complete coverage of the surface of viewing platform 36.

Figure 8:
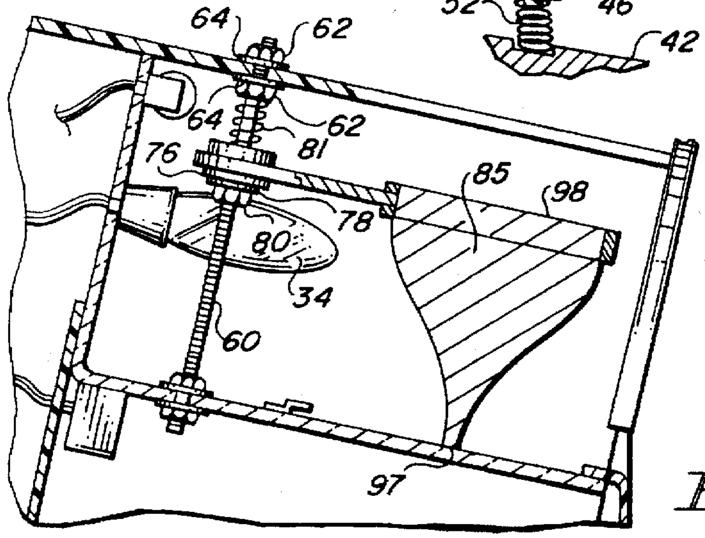
FIG. 8 is a partial cross sectional side view of another embodiment showing an alternate second lens useful in the present invention.

In an alternate embodiment best seen in FIG. 8, conventional second lens 35 has been replaced with a fiber optic reading magnifier 85. The illustrated magnifier is the 1.8X Type ES available from TaperVision of Newton, Mass. Magnifier 85 is three inches (7.6 centimeters) tall with a lower circular opening 97 of approximately ¼ inch (0.635 centimeters) which expands to a 1.8 inch (4.6 centimeter) upper opening 98. In this embodiment, magnifier 85 is also mounted to lens mount 37. In turn, to accomodate the height of magnifier 85, lens mount 37 is positioned higher on bolt 60.

In addition, the proper functioning of magnifier 85 requires that lower circular opening 97 be in contact with the paper being inspected on viewing platform 36. To accomodate this functional requirement of magnifier 85, the upper opposing washer 78 and opposing nut 80 previously illustrated in FIG. 5 as being mounted atop the upper opposing spacer 76 have been replaced by a spring 81 which biases magnifier 85 into contact with viewing platform 36. However, spring 81 allows a user to lift magnifier 85 up and rotate or slide it as previously described in connection with lens 35. Once positioned as desired, the user releases magnifier 85 and spring 81 pushes it back into contact with any paper mounted on viewing platform 36.

As best seen in FIGS. 2–4, viewing platform 36 includes transparent stationary viewer 38 which is mounted to structure 12 as best seen in FIG. 2. Mounted atop viewer 38 is mounting frame 40. Mounting frame 40 as shown is an elongated piece extending laterally across viewer 38. As best seen in FIG. 2, frame 40 has a dogleg cross section with a first leg 86 extending rearwardly and mounted directly to viewer 38. A second leg 87 extends forwardly and, with the upper surface of viewer 38, forms a cavity 88. Cavity 88 is used to secure the rearward edge of paper flat to viewer 38.

Figure 7:
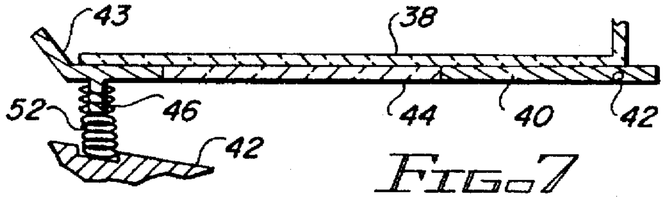
FIG. 7 is a side view of an alternate embodiment of a viewing platform used in the present invention.

Turning now to FIG. 7, an alternate embodiment of viewing platform 36 is best illustrated. A transparent stationary viewer 38 is mounted to structure 12 as in the prior discussion. However, pivotally mounted directly beneath and abutting stationary viewer 38 is mounting frame 40. Mounting frame 40 includes a transparent viewer 44 mounted therein. On each side of frame 40 proximate to the rear side are two posts 42 about which frame 40 pivots. On the front side of frame 40, a press bar 43 is preferably provided. Press bar 43 extends the length of the front side of frame 40 and is angled upwardly therefrom.

Positioned on the bottom of frame 40 proximate to the front corners thereof are two spring posts 46 which mate with and cooperate with springs 52 mounted in foot 48 to bias frame 40 to a closed position abutting stationary viewer 38. To move frame 40 to an open position, the user will depress press bar 43 which causes frame 40 to pivot about posts 42 thereby separating frame 40 from stationary viewer 38. The paper to be inspected is then inserted atop viewer 44 and press bar 43 released. Springs 52, guided by posts 46, push frame 40 back into the closed position thereby securing the paper therebetween. The paper is mounted between the two transparent viewers 38 and 44.

As best seen in FIG. 2, bottom 13 of structure 12 is mounted to foot 48. Foot 48 slanted to tilt the entire structure 12 forwardly. Such a tilt provides a more convenient orientation for the user by allowing a direct view through first lens 22 from an upright position in which the user does not need to bend or lean over device 10 to see the paper mounted therein.

Back light 50 is mounted to a light base extension 90 mounted to light base 30 which extends downwardly therefrom into foot 48 thereby positioning back light 50 below viewing platform 36. When illuminated, light 50 back lights any paper mounted on viewing platform 36. In the preferred embodiment, back light 50 is a 5 VOC, 0.94 Amp lamp available as either OPTIBEAM R250G or OPTIBEAM R252H from Poly-Optical products of Irving, Calif.

Mounted on the exterior of structure 12 are main on/off switch 92, sequencer 94 and manual selector 96 which are in electrical communication with ultraviolet light 32, top lights 34, back light 50 and a power source (not shown). Main on/off switch 92 mounted to rear panel 16 turns power on and off to the entire unit. In the presently preferred embodiment, switch 92 activates ultraviolet light 32 which remains on at all times. Since ultraviolet light 32 is fluorescent it cannot be rapidly switched on and off as with incandescent bulbs used for back light 50 and top lights 34.

Figure 6:
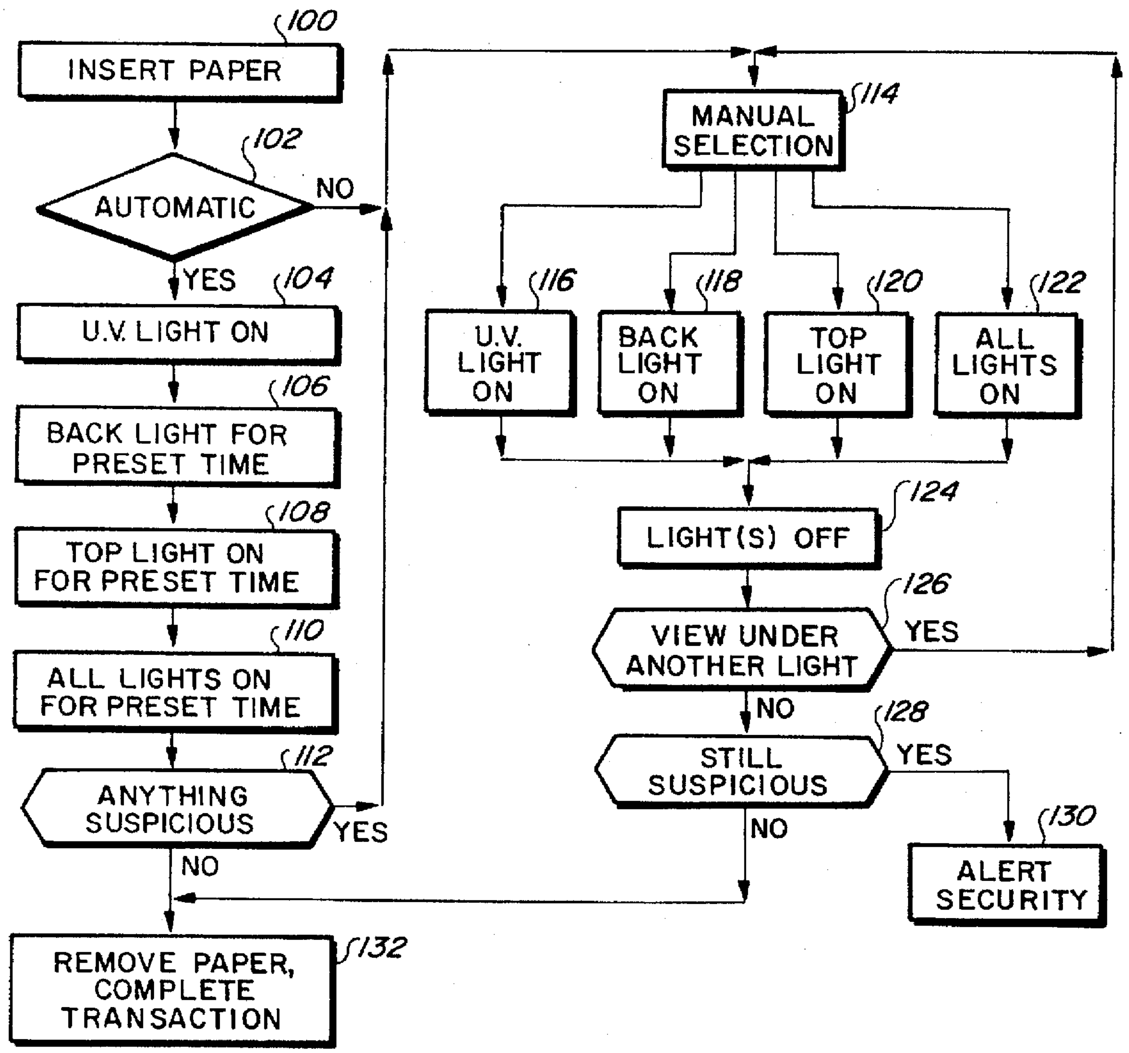
FIG. 6 is a block diagram showing the preferred operational sequence of the present invention.

As best illustrated in FIG. 6, in the usual operation, the user would insert the paper into the device 10 via cutout 15 onto viewer 38 as noted in step 100 and then select automatic operation via sequencer 94 as noted in step 102, though a manual selection is possible by going directly to manual selector 96. The paper is viewed through first lens 22 with only ultraviolet light 32 on for a preset time as noted in box 104. The preset time is preferably between one (1) to fifteen (15) seconds, most preferably less than five (5) seconds, for each step. After that time, the process automatically proceeds through steps 106 to 110 where back light 50 activates for the same preset time (with always activated ultraviolet light 32) followed by top light 34 and lastly by all lights 32, 34 and 50.

In the event the user notes a suspicious item is step 112 under one or more lights, manual selector 96 can be used to selectively activate one or more lights as noted in steps 114 through 126. Manual selector 96 allows the user to selectively illuminate the various lights 32, 34 or 50, alone or in combination, as desired for as long as desired. Manual selector 96 in combination with second lens 35 allows for a very detailed inspection of the paper in question if needed.

In the event that suspicions are still raised in step 128, the user would notify security in step 130 for an expert analysis. In event that suspicions are alleviated in step 128, or never raised in step 112, the user would remove the paper and complete the transaction as desired as noted in step 132.

Although only certain embodiments have been illustrated and described, it will be apparent to those skilled in the art that various changes and modifications may be made therein without departing from the spirit of the invention or from the scope of the appended claims.

What is claimed is:

1. A counterfeit detection apparatus for analyzing paper to detect counterfeits thereof, the apparatus comprising:

a structure;

a foot mounted below the structure;

a first lens mounted atop the structure;

means for mounting the paper in the bottom of the structure above the foot;

a ultraviolet light mounted on the structure between the first lens and the paper, at least one top light mounted on the structure between the first lens and the paper, a back light in the foot below the paper; and a control circuit in electrical communication with the ultraviolet light, the at least one top light and the back light, the control circuit sequentially activating the ultraviolet light, the at least one top light and the back light.

2. The apparatus of claim 1 further comprising a second lens mounted between the first lens and the paper, the second lens in combination with the first lens having higher magnification than the first lens alone.

3. The apparatus of claim 2 wherein the first lens alone has about 2× magnification and the second lens in combination with the first lens having about 8× magnification.

4. The apparatus of claim 2 wherein the second lens is a fiber optic reading magnifier.

5. The apparatus of claim 2 further comprising a lensing platform mounted atop the structure, the first lens being mounted thereto.

6. The apparatus of claim 5 further comprising a lighting platform mounted between the lensing platform and the paper, the ultraviolet light, the at least one top light and the second lens being mounted underneath the lighting platform.

7. The apparatus of claim 6 further comprising a viewing platform mounted opposite the lensing platform, the paper being mounted to the viewing platform.

8. The apparatus of claim 7 wherein the viewing platform comprises a stationary viewer pivotally connected to a mounting frame, the paper being secured therebetween.

9. The apparatus of claim 8 wherein the stationary viewer and the mounting frame having an open position for placing the paper therebetween, the stationary viewer and the mounting frame having a closed position securing the paper therebetween, the mounting frame and stationary viewer being biased to the closed position.

10. The apparatus of claim 7 wherein the lighting platform comprises a U-shaped support frame having two legs which extend forwardly from a base, the ultraviolet light being positioned underneath the base, the apparatus having two top lights, the top lights being positioned underneath the legs.

11. The apparatus of claim 10 further comprising a bolt extending between the lighting platform and the viewing platform, the second lens being rotatably and slidably mounted upon the bolt.

12. The apparatus of claim 1 wherein the bottom of the foot is slanted to tilt the structure forwardly for a user to view the paper from an upright position.

13. The apparatus of claim 1 wherein the control circuit is mounted on the structure.

14. The apparatus of claim 1 wherein the control circuit further comprises a power source, a control panel and a variable timer.

15. The apparatus of claim 14 wherein the control panel includes an on/off switch, a manual/automatic selector switch, a dimmer switch and a manual selector.

16. A counterfeit detection apparatus for analyzing paper to detect counterfeits thereof, the apparatus comprising:

a structure;

a foot mounted below the structure, the bottom of the foot being slanted to tilt the structure forwardly whereby a user views the paper from an upright position;

a lensing platform mounted atop the structure, the lensing platform having a first lens having about a 2× magnification mounted thereon;

a viewing platform comprising a stationary viewer pivotally connected to a mounting frame, the stationary viewer and the mounting frame having an open position for placing the paper therebetween, the stationary viewer and the mounting frame having a closed position securing the paper therebetween, the mounting frame and stationary viewer being biased to the closed position, the viewing platform being mounted proximate to the bottom of the structure above the foot;

a lighting platform mounted between the lensing platform and the paper, the lighting platform comprising a horizontally oriented U-shaped support frame having two legs which extend forwardly from a base, a second lens rotatably and slidably mounted between the lighting platform and the viewing platform, the second lens in combination with the first lens increasing the magnification to greater that that of the first lens alone, a ultraviolet light mounted underneath the base, two top lights underneath the legs, a back light in the foot below the paper; and a control circuit in electrical communication with the ultraviolet light, the at least one top light and the back light, the control circuit sequentially activating the ultraviolet light, the at least one top light and the back light, the control circuit being mounted on the structure.

* * * * *